United States Patent [19]

Plaza et al.

[11] 3,985,404
[45] Oct. 12, 1976

[54] CARRIAGE SUPPORT APPARATUS

[75] Inventors: Mario G. Plaza, Fremont; Richard D. Trezise, Newark, both of Calif.

[73] Assignee: Xerox Corporation, Stamford, Conn.

[22] Filed: June 20, 1975

[21] Appl. No.: 588,995

[52] U.S. Cl. .................................. 308/5 R; 184/5
[51] Int. Cl.² .......................................... F16C 33/72
[58] Field of Search ............ 308/5 R, 36, 36.1, 122; 184/5, 100

[56] References Cited
UNITED STATES PATENTS

| | | | |
|---|---|---|---|
| 3,527,507 | 9/1970 | Clark et al. | 308/3.5 |
| 3,578,826 | 5/1971 | Janiszewski | 308/5 R X |
| 3,692,272 | 9/1972 | Radke | 308/3.5 UX |
| 3,718,209 | 2/1973 | Moslo | 308/5 R X |
| 3,885,176 | 5/1975 | Cunningham | 308/36.1 |

*Primary Examiner*—M. H. Wood, Jr.
*Assistant Examiner*—Gene A. Church
*Attorney, Agent, or Firm*—J. E. Beck; T. J. Anderson; B. P. Smith

[57] ABSTRACT

Apparatus for supporting a carriage about an elongate shaft for linear movement of the carriage along the shaft. The apparatus comprises an elongate tubular housing to which a carriage may be mounted, the housing having opposing normally open ends, a pair of linear bearings mounted in the housing in spaced apart relation adjacent respective opposing ends thereof, the bearings having aligned openings for receiving an elongate shaft in contacting relatively movable relation, and means included in the housing for lubricating the bearings during movement of the housing along an elongate shaft disposed therethrough.

10 Claims, 1 Drawing Figure

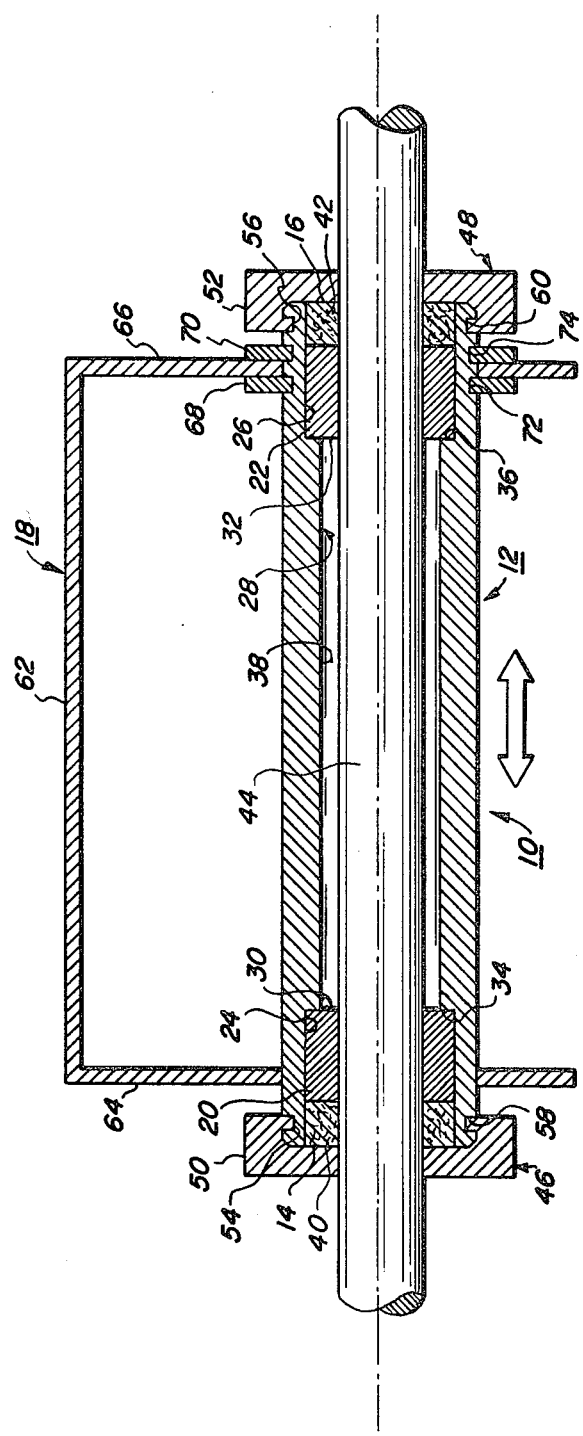

CARRIAGE SUPPORT APPARATUS

BACKGROUND OF THE INVENTION

This invention relates to support apparatus and, more particularly, to apparatus for supporting a carriage about an elongate shaft for linear movement of the carriage along the shaft.

Carriage support apparati of the type above-described have been found useful in many different machine environments where it is necessary to move an assembly linearly with respect to a stationary member. An example of a machine having need for such a support apparatus is a high speed serial printer of the type in which a printing assembly comprising a rotatable print print wheel, a hammer for striking a selected character element on the wheel and a ribbon cartridge is mounted to a carriage, and in which the carriage is supported for movement along a pair of rods or shafts by a respective pair of support apparati. In accordance with known high speed serial printers of this type, the support apparati employed generally each include a set of roller bearings, means for mounting the bearings to the carriage and means for biasing the bearings against the respective shaft.

There are certain inherent disadvantages from the use of roller bearings and biasing means in a carriage support apparatus. For example, each roller bearing presents a point contact with the associated shaft at any instant of time and is thus subject to wear at the line apex of the bearing. Further, the carriage may be subject to rocking about a pivot line perpendicular to the axes of the shafts when moved along the shafts at high speeds due to the biasing of the bearings against the shafts. Such rocking is especially undesirable in the context of a printing machine where print quality might be adversely impaired thereby. Additionally, the need for a biasing means for each of a plurality of roller bearings adds to the cost and complexity of the support apparatus.

Accordingly, it would be desirable to provide a carriage support apparatus capable of supporting a carriage about an elongate shaft for linear movement of the carriage along the shaft, which apparatus is substantially free of the above disadvantages.

SUMMARY OF THE INVENTION

To this end, a carriage support apparatus in accordance with the present invention comprises an elongate tubular housing to which a carriage may be mounted, the housing having opposing normally open ends, a pair of linear bearings mounted in the housing in spaced apart relation adjacent respective opposing ends of the housing, the bearings having aligned openings through which an elongate shaft may be disposed in contacting relatively movable relation, and means included in the housing for lubricating the bearings during movement of the housing along an elongate shaft disposed therethrough.

The use of linear bearings avoids the wear problems peculiar to roller bearings and, since biasing means for the bearings are not employed, the chances of the carriage experiencing rocking of the type above-described is virtually eliminated. Prolonged wear of the linear bearings is insured by the inclusion of lubrication means in the housing. Further, the housing itself acts as a shield of the region on the shaft between the two bearings in order to prevent a significant build-up of dirt and debris in this region which might damage the bearings during movement thereof along the shaft.

In accordance with another aspect of the present invention, means are mounted to the housing for pushing dirt and debris collected on regions of the shaft outside the housing away from the ends of the housing as the housing is moved along the shaft thereby further protecting the bearings from damage.

BRIEF DESCRIPTION OF THE DRAWING

These and other aspects and advantages of the present invention will be more completely described below with reference to the accompanying drawing wherein the single FIGURE thereof is a cross-sectional view of a carriage support apparatus embodying the principles of the present invention.

DESCRIPTION OF THE PREFERRED EMBODIMENT

Referring now to the single FIGURE of the drawing, a carriage support apparatus 10 is shown comprising an elongate tubular housing 12 having opposing normally open ends 14 and 16. A carriage 18 is capable of being mounted to housing 12 in a manner to be described below. Housing 12 may be made of any suitable material having the requisite strength, durability and performance characteristics necessary for the particular machine environment in which it will be employed. If support apparatus 10 is to be used to support the printing assembly of a high speed serial printer about a respective one of a pair of shafts, then it is preferred housing 12 be manufactured of a light weight durable material, such as aluminum or an aluminum alloy.

Carriage support apparatus 10 further comprises a pair of linear bearings 20 and 22 mounted in housing 12 adjacent respective opposing ends 14 and 16 thereof. The outer surface of each bearing is tightly fitted against a respective one of a pair of recessed portions 24 and 26 of the inner wall 28 of the housing with the opposing inner ends 30 and 32 of the bearings 20 and 22 abutting a respective pair of shoulders 34 and 36. Shoulders 34 and 36 are formed in inner wall 28 at the junctions of the recessed portions 24 and 26 with a remaining intermediate portion 38 of the inner wall.

Each of the bearings 20 and 22 has an axial length somewhat members than the respective recessed portion of the inner wall against which it is tightly fitted in order that a respective one of a pair of lubricating membrs 40 and 42, preferably in the form of felt pad rings, may be fitted into the housing against such respective recessed portion and then lubricated with a lubricating liquid, such as oil. Desirably, the rings 40 and 42 abut their respective bearings. The bearings and felt pad rings all have aligned central openings through which a shaft 44 may be disposed in contacting relatively movable relation. Thus, as the housing 12 is reciprocated back and forth along the shaft 44, the housing rides on bearings 20 and 22 which are lubricated by the respective felt pad rings. Actually, of course, the rings lubricate the surface of the shaft which then lubricates the bearings during moving contact.

It will be appreciated by those skilled in the art that the position of each bearing and its abutting felt pad ring could be reversed in the housing, if such relation is more desirable in view of the intended use. However, for most uses, it is preferred that the felt pads be located outwardly of the bearings for ease of lubricating or re-lubricating it with oil and for protecting the bearings from dirt and debris collected on the shaft. It will be further appreciated that the felt pad rings could be spaced from their respective bearings instead of abutting them, although the latter relationship is preferred.

Although any suitable linear bearings may be employed consistent with the dimensional criteria above-outlined and the intended machine environment in which it will be used, it is preferred that the bearings be manufactured of stainless steel which is especially well suited for prolonged high speed reciprocal movements of the type that occurs in high speed serial printers.

With two spaced apart bearings riding along a shaft 44 disposed therethrough, it is important to protect the region of the shaft between the bearings from a significant build-up of dirt and debris which might ordinarily damage the bearings during reciprocal movement, and especially high speed reciprocal movement. Such protection is afforded by the housing 12 itself which acts as an environmental shield for the region of the shaft between the bearings.

In order to provide even further protection for the bearings, the support assembly may additionally include means for pushing debris collected on the shaft 44 away from the ends 14 and 16 of the housing 12 when the housing is moved along the shaft. Desirably, such pushing means includes a pair of wiper rings 46 and 48 mounted exteriorly of the housing to respective opposing ends 14 and 16 thereof. Each wiper ring has a central opening through which the elongate shaft 44 may be disposed in contacting relatively movable relation. Each wiper ring further has an annular flange portion 50 and 52, respectively. Each flange portion includes an annular lip 54 and 56, respectively, extending downwardly therefrom. Lips 54 and 56 are each adapted to be snapped into a respective one of a pair of annular notches 58 and 60 formed in the outer wall of the housing adjacent respective opposing ends of the housing. In operation, as the housing 12 is moved to the left in the drawing along shaft 44, wiper ring 46 pushes debris away from end 14 of the housing, whereas when the housing is moved to the right, wiper ring 48 pushes debris away from end 16. Aside from this function, it will be clear that rings 46 and 48 assist in retaining the felt pads 40 and 42 in the housing.

Reference is now made to carriage 18 and the manner in which it is mounted to the housing. Although a specific carriage 18 and mounting means therefor is depicted in the drawing, it will be appreciated that such is merely exemplary, as the precise nature of the carriage and mounting means will vary dependent upon the nature of the assembly or device to be carried and the overall machine environment.

Carriage 18 is preferably comprised of a central support portion 62 and two depending flange portions 64 and 66. Flange portions 64 and 66 have aligned openings therein through which housing 12 may be disposed. If carriage 18 is to be used to transport an assembly, such as the printing assembly of a high speed serial printer, along a pair of shafts 44, then it would have a pair of spaced openings in each flange portion through which a pair of housings 12 would be disposed, each housing 12 riding along a respective one of the pair of shafts 44.

Any suitable means for mounting carriage 18 to housing 12 for movement therewith along shaft 44 may be employed. An example of one such means is a pair of retaining rings 68 and 70 snapped into corresponding annular notches 72 and 74 formed in the outer surface of the housing on either side of one of the flange portions of the carriage 18, e.g. flange portion 66. The retaining rings are dimensioned so as to forceably abut opposing sides of the flange portion 66 thereby preventing any lateral movement of the carriage 18 relative to the shaft 44. To further insure a prevention of such movement, another pair of retaining rings (not shown) may be used in connection with a corresponding other pair of annular notches (not shown) formed in the housing outer surface to hold fast the other depending flange portion 64 of the carriage 18.

Although a particular embodiment of the present invention has been described in detail above with reference to the accompanying drawing, it will be appreciated by those skilled in the art that various modifications, substitutions, etc. may be made without departing from the spirit and scope of the invention as defined by the appended claims.

What is claimed is:

1. Apparatus for supporting a carriage about an elongate shaft for linear movement of the carriage along the shaft, the apparatus comprising:

an elongate tubular housing to which a carriage may be mounted, said housing having opposing normally open ends;

a pair of linear bearings mounted in said housing in spaced apart relation adjacent respective opposing ends of said housing, said bearings having aligned openings through which an elongate shaft may be disposed in contacting relatively movable relation; and means included in said housing for lubricating said bearings during movement of the housing along an elongate shaft disposed therethrough, said means for lubricating including a pair of lubricating members respectively associated with the pair of linear bearings, each lubricating member being fabricated of an absorbant material and having a central opening through which an elongate shaft may be disposed in contacting relatively movable relation.

2. The apparatus of claim 1, wherein each lubricating member is mounted in the housing in abutting relation with its associated linear bearing.

3. The apparatus of claim 2, wherein each lubricating member includes a felt pad ring.

4. The apparatus of claim 1, further including means mounted to said housing for pushing debris collected on an elongate shaft disposed through the housing away from the ends of said housing when said housing is moved along the shaft.

5. The apparatus of claim 4, wherein said means for pushing includes a pair of wiper members mounted exteriorly of the housing to respective opposing ends of said housing, each wiper member having a central opening through which an elongate shaft may be disposed in contacting relatively movable relation.

6. In combination with a carriage having a supporting portion and at least one flange portion, apparatus for supporting said carriage about an elongate shaft for linear movement of the carriage along the shaft, said apparatus comprising:

an elongate tubular housing to which said carriage is mounted, said housing having opposing normally open ends and at least one pair of annular notches formed in the outer surface thereof;

a pair of linear bearings mounted in said housing in spaced apart relation adjacent respective opposing ends of said housing, said bearings having aligned openings through which an elongate shaft may be disposed in contacting relatively movable relation;

means included in said housing for lubricating said bearings during movement of the housing along an elongate shaft disposed therethrough; and means cooperating with said at least one pair of notches for securing said at least one flange portion to said housing.

7. The combination of claim 6, wherein said means for securing includes at least one pair of retaining rings fittable in said at least one pair of notches.

8. The combination of claim 7, wherein said means for lubricating includes a pair of lubricating members respectively associated with the pair of linear bearings, each lubricating member being mounted in the housing in abutting relation with its associated linear bearing.

9. The combination of claim 8, further including means mounted to said housing for pushing debris collected on the outer surface of an elongate shaft disposed through the housing away from the ends of said housing when said housing is moved relative to the shaft.

10. In combination with a carriage having a supporting portion and at least one flange portion, apparatus for supporting said carriage about an elongate shaft for linear movement of the carriage along the shaft, said apparatus comprising:

an elongate tubular housing to which said carriage is mounted, said housing having opposing normally open ends;

a pair of linear bearings mounted in said housing in spaced apart relation adjacent respective opposing ends of said housing, said bearings having aligned openings through which an elongate shaft may be disposed in contacting relatively movable relation;

means included in said housing for lubricating said bearings during movement of the housing along an elongate shaft disposed therethrough; and means for securing said at least one flange portion to said housing.

* * * * *